United States Patent [19]

Lofgren et al.

[11] 3,998,171
[45] Dec. 21, 1976

[54] DEPTH-INDICATING PLANTING MACHINE

[75] Inventors: Stig-Gunnar Löfgren, Jarved; Fride Moberg, Ornskoldsvik, both of Sweden

[73] Assignee: Mo och Domsjo Aktiebolag, Ornskoldsvik, Sweden

[22] Filed: Nov. 22, 1974

[21] Appl. No.: 526,278

[30] Foreign Application Priority Data

Nov. 29, 1973 Sweden .............................. 7316167

[52] U.S. Cl. ..................................... 111/2; 111/89
[51] Int. Cl.² ......................................... A01C 11/00
[58] Field of Search ...................... 111/89, 2, 6, 7; 172/22

[56] References Cited
UNITED STATES PATENTS

| | | | |
|---|---|---|---|
| 2,776,633 | 1/1957 | Bible | 111/2 |
| 3,029,756 | 4/1962 | Kriuda | 111/89 X |
| 3,450,073 | 1/1969 | Baker | 111/89 |

Primary Examiner—Stephen C. Pellegrino

[57] ABSTRACT

A planting machine is provided having a pneumatic depth indicator on the digging tool and comprising at least one gas conduit for conveying a gas under superatmospheric pressure from one end to the other end thereof, the one end being connected to a gas supply source, and the other end being open to atmosphere and spaced a distance from the digging tool end equal to the depth of the hole dug by the tool for a plant, the other end being so arranged that the opening to atmosphere is plunged into blocking contact to the earth when the predetermined hole depth is reached, thereby halting flow of gas from the conduit.

10 Claims, 5 Drawing Figures

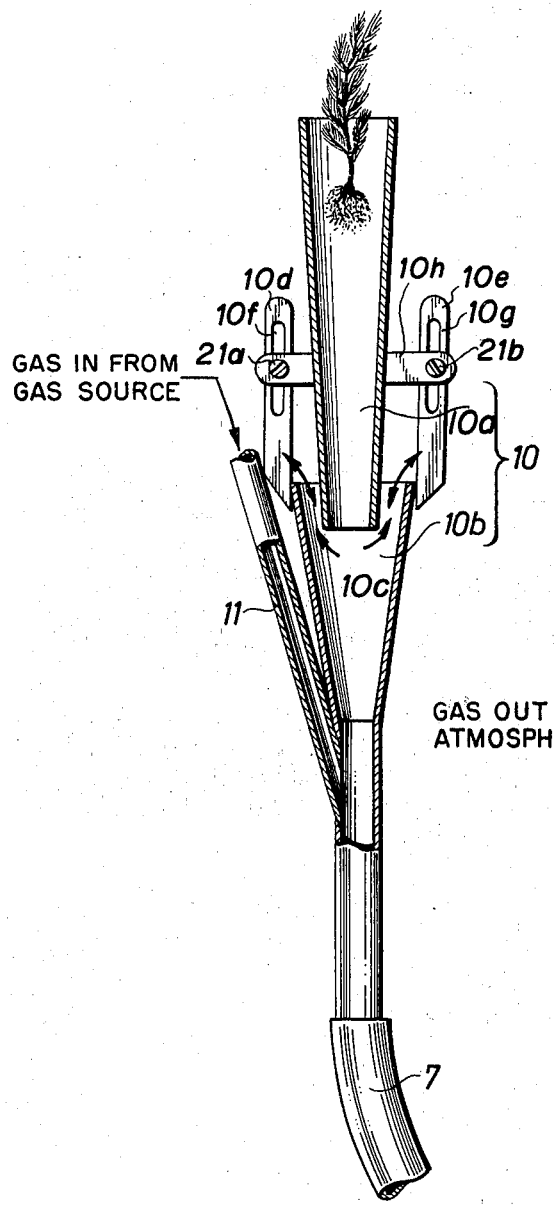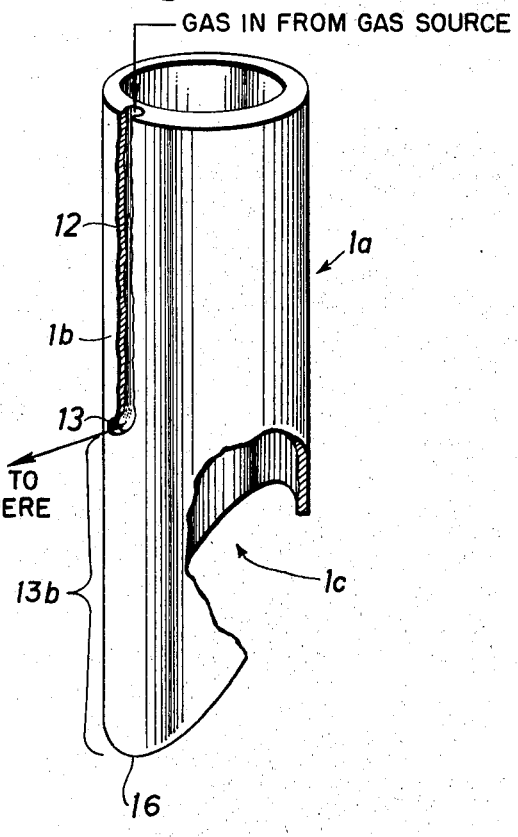

DEPTH-INDICATING PLANTING MACHINE

Planting machines are now widely used in reforestation of cut or burned over or otherwise barren forest land. Frequently, however, the machines fail to set the plants in deeply enough, and as a result the plants do not grow well and may die. This problem is due to the presence of obstacles in the ground, such as stones, stubs, large roots and the like, which prevent the digging devices of the planter from penetrating deeply enough into the ground.

To ensure that each plant is set to a proper depth, it is necessary to measure accurately the depth of the hole in which the plant is to be set, and transfer the plants from the machine to a hole only when the hole is deep enough. Devices for measuring or sensing the depth of a hole in which a plant is to be set are normally constructed so that the digging tool itself measures the depth of the hole, with the surface of the ground as a reference surface for a slide shoe or the like connected with said digging tool, and moved along said surface of the ground. However, such a device can give a signal for transferring a plant from the planting apparatus to the intended hole when the hole is too shallow, if the slide shoe becomes positioned at a higher level than the ground, on a raised stone or some other obstacle at the same time as the digging tool digs into the ground. In such a case the vertical distance between the upper surface of the obstacle and the point of the digging tool is the sum of the elevation of the object above the ground and the resulting depth of the hole, and the correct depth is signaled when the hole is too shallow.

There are two main types of reforestation or planting machines: those provided with tubular hole-making devices, and those provided with tubular plowing devices, which dig a furrow that has the hole at a deep end or portion thereof. Both of these devices operate intermittently. The tubular plowing device has a number of serious disadvantages. Such devices take longer to plow a hole and plant a plant than the short time from 2 to 4 seconds allotted for each single planting operation, due to the fact that the feed-out end of the planting tool is either substantially planar or slightly V-shaped. Consequently, the planting means, despite its simultaneous forward movement, encounters a high degree of resistance when moved into the ground.

The planting device upon being moved into the ground also may rest on a branch or the like extending in the direction of movement by the planting machine, when the planting apparatus is preceeded in the forward movement path by a ground-preparing scarifying wheel or the like. Branches picked up by the wheel are moved to beneath the planting device, thereby delaying the insertion of said device into the ground, so that a plant is either fed from the planting machine too early, or not at all.

Another disadvantage of tubular plowing devices is that, even when the devices are arranged to be inserted into the ground with an oblique, downward movement, the earth tends to penetrate the plant exit orifice of the planting device, and makes feeding of the plants through the orifice difficult. The reason why earth penetrates the planting tube is that the downwardly facing orifice of the tubular planting device is either substantially horizontal or is inclined to the surface of the ground at an angle which is smaller than the angle formed between the movement path of the planting device and the surface of the ground. The significance of this is disclosed more clearly hereinafter.

The present invention overcomes these difficulties by providing a pneumatic depth indicator on the digging tool. The planting machine of the invention comprises, in combination, a digging tool; a vehicle carrying the digging tool; and a depth indicator in operative association with the digging tool signalling when the digging tool has reached a predetermined depth for a plant to be transferred from the machine, the depth indicator comprising at least one gas conduit for conveying a gas under superatmospheric pressure from one end to the other end thereof, the one end being adapted to be connected to a gas supply, the other end being open to the atmosphere and spaced a vertically projected distance from the tip of the digging tool equal to the depth of the hole dug by the tool for a plant, and so arranged that the opening to atmosphere is plunged into blocking contact to the earth when the predetermined hole depth is reached, thereby halting flow of gas from the conduit.

The depth indicator is adapted to be connected to means for maintaining a constant superatmospheric pressure in the conduit, or alternatively, means for causing gas to flow therethrough while the digging tool is being moved into the ground, and a gas-pressure measuring device detecting an increase in the pressure in the conduit caused by earth blocking the outflow of gas from the other end of the conduit, when the tube reaches the surface of the ground, as the predetermined depth is reached by the digging tool.

Thus, when the digging tool reaches the desired planting depth, the open end of the conduit is automatically covered by the upper layer of earth on the surface of the ground, thereby causing an increase in gas pressure in the conduit. This increase in gas pressure is immediately registered by the gas pressure measuring device, which rapidly and reliably indicates that the desired planting depth has been reached. The depth measuring function of the planting machine is thus totally independent of local depressions or obstacles located adjacent the hole. After the predetermined planting depth has been reached, and the digging tool lifted out of the hole, any earth present in the open end of the conduit is removed by flowing gas therethrough.

The gas conduit can be a part of or attached to the digging tool. In the device shown in the drawings, the conduit is an internal passage built into the tool. This is convenient, since it shelters the conduit, and prevents damage during digging.

If an exposed conduit poses no difficulty, the conduit can be a tube or line attached to the exterior of the digging tool. Such a construction makes it possible to attach the tube movable thereto, so that the location of the open end of the conduit can be adjusted to accommodate any size plant desired.

The design of the digging tool can be nicely coordinated with the design of the depth indicator. In accordance with a preferred embodiment of the invention, the digging tool is a tube whose digging end is cut off at an angle of less than 45° and preferably less than 30° to the axis of the tube, producing a sharp tip with an opening of oval configuration and downwardly curved, as seen in the direction of travel of the tool while digging, with the long axis of the oval-shaped end being vertically directed and being from about 2.5 to about 6, preferably from 3 to 4, times longer than the short axis. This design of digging tool tip gives better digging in the presence of obstacles such as branches, stones, and similar solid objects. This increases digging speed, and, in combination with the rapidly operating depth indicator, gives a high planting rate.

The present invention is particularly suitable for hole-type and plowing-type planting devices having a digging tool arranged to be inserted into the ground along a straight or arcuate path to make a hole or to plow a furrow, said paths being directed obliquely downwards and forwards, in the direction of movement of the vehicle carrying the device. The discharge end of the digging tool is cut obliquely downwardly and forwardly in the direction of movement of the vehicle, in a plane which, during the whole of the insertion movement of the planting device or during the latter part of said movement, is inclined more steeply than the direction in which the digging tool is inserted into the ground. The tip of the digging tool is placed so that the leading side is solid tube, and the oval opening faces rearwardly. Consequently, the leading side of the tube prevents earth from penetrating into the tube, and becoming packed therein as the digging tool makes a hole or plows a furrow in the ground. In this way, interruptions in operation as a result of earth packing in the mouth of the tube are prevented, which also contributes to a high planting rate by the planting machine constructed in accordance with the invention.

The invention is described in detail with reference to a preferred embodiment thereof illustrated in the accompanying drawings, in which.

Figure 1:
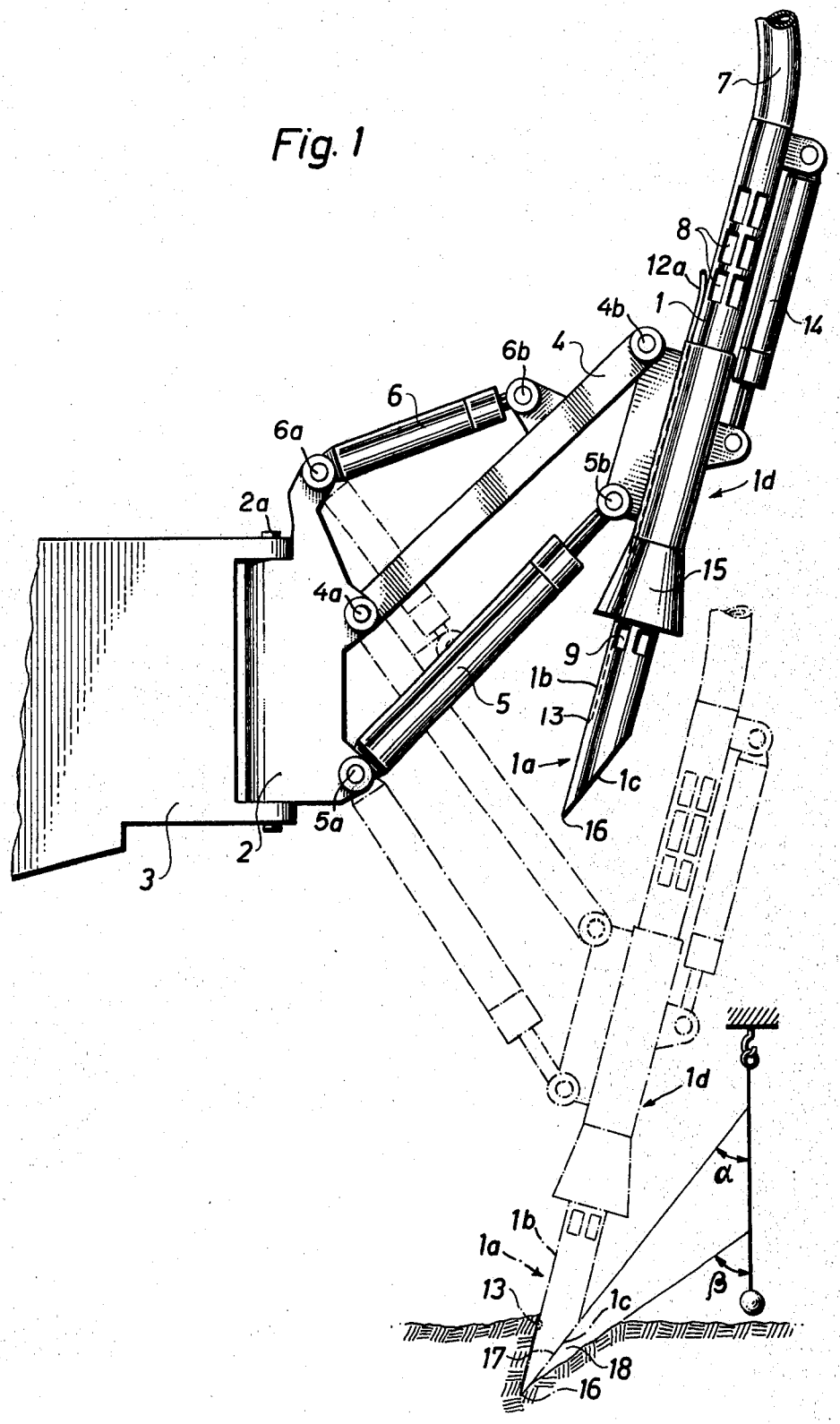
FIG. 1 is a side view of a planting machine according to the invention, showing the hole digging tool of the planting device in solid lines in a first position, and in dashed lines in a digging position.
Figure 2:
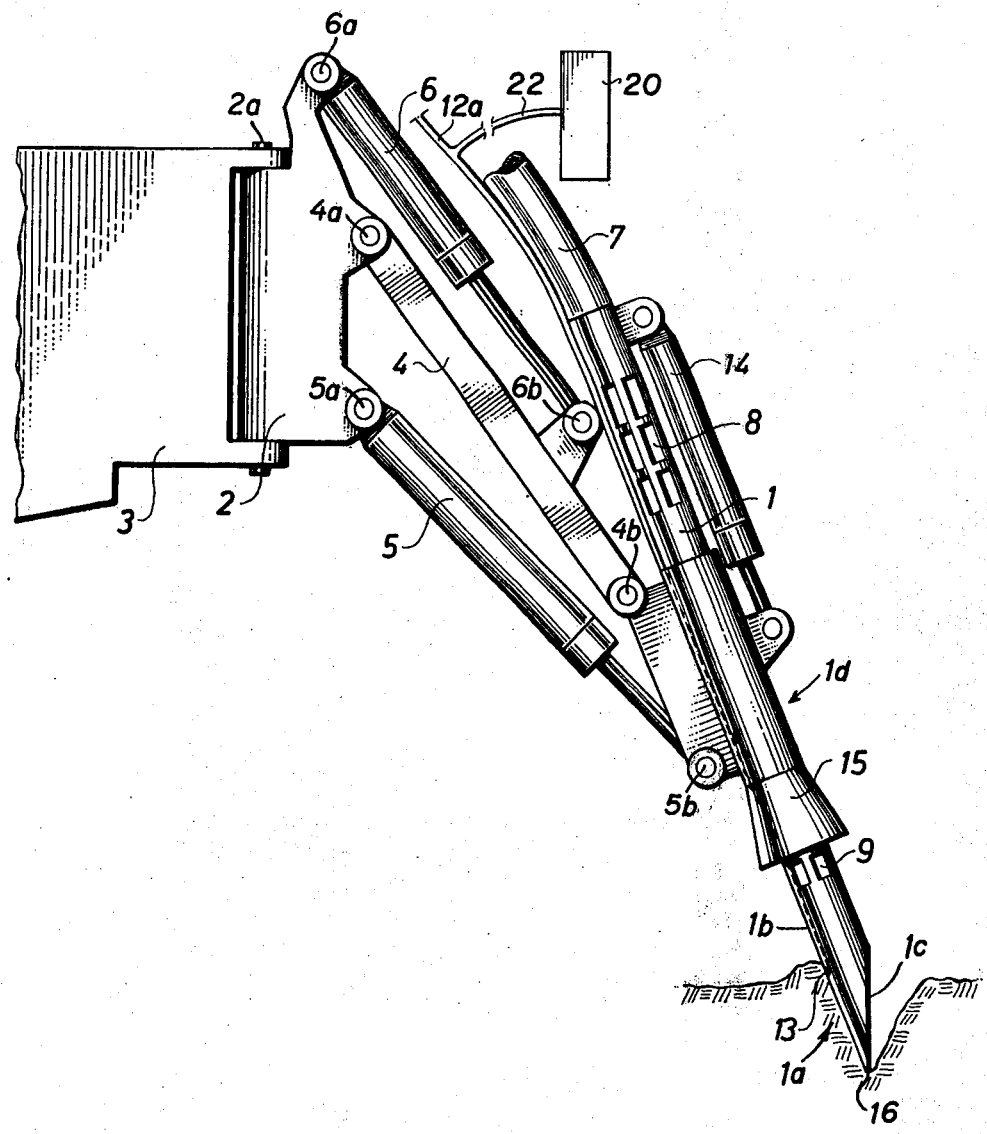
FIG. 2 is a further side view, showing the digging tool according to FIG. 1 in another digging position.

FIG. 3 shows a plant feed means operating in conjunction with a pneumatic system for the transport of plants, as arranged for attachment to the feed inlet 7 of the device of FIGS. 1 and 2; and FIG. 4 shows in detail the depth-sensing end of the depth indicator on the digging tool of the device of FIGS. 1 and 2.

Figure 5:
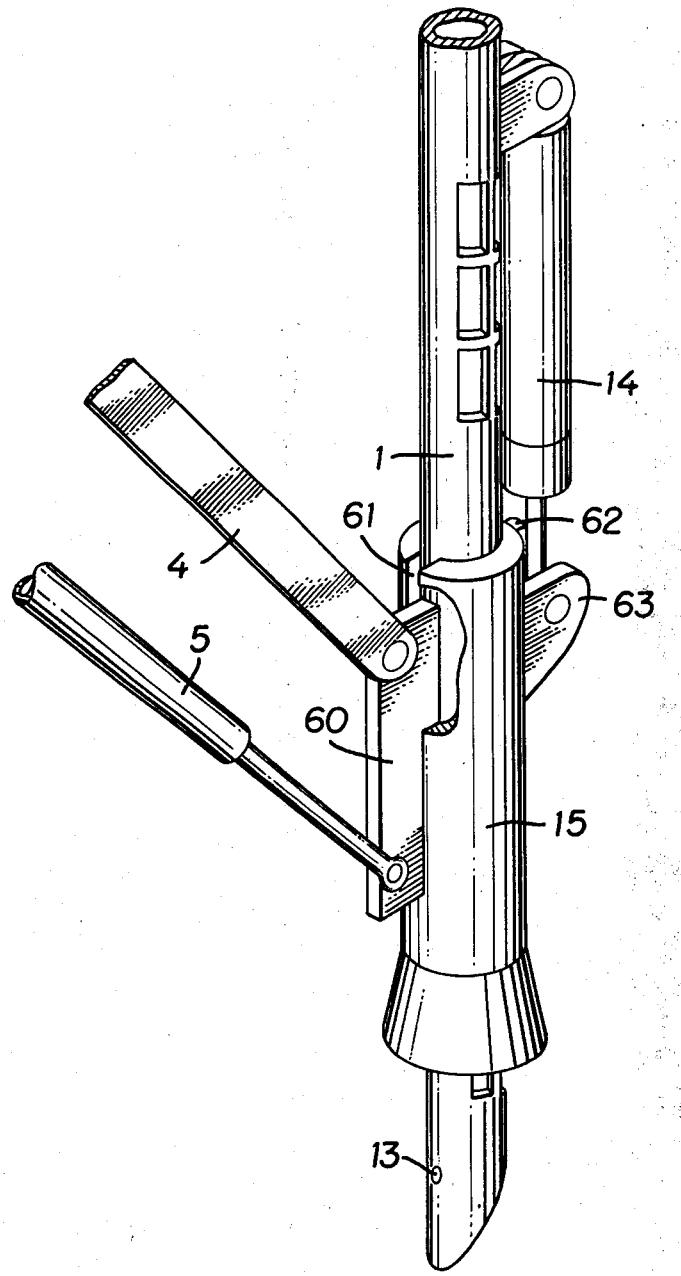

FIG. 5 is a further view, showing how the compacting means is structurally mounted on the tube, for relative movement with respect thereto.

The planting device shown in FIGS. 1 to 5 is adapted to dig holes into which a plant can be placed, to feed a plant into the hole, and to pack the earth around the plant, and plant it. The device of FIGS. 1 to 5 has a tube through which the plants are fed to the hole dug by the device. The tube 1 includes a digging tool at the digging end 1a with a tip 16 and an oval opening 1c. The digging tool has the leading face 1b facing forward and the opening 1c facing rearwardly.

The tube 1 is carried on a bracket 2 which is pivotally arranged on an axle 2a carried upon a horizontal rear portion 3 of a vehicle. The bracket 2 carries a link 4 and two hydraulic cylinders 5, 6, all pivotally connected thereto on pivot pins 4a, 5a, 6a. These in turn are pivotally connected via pivot pins 4b, 5b, 6b to the tube 1, so that the tube 1 can be pivoted between an upper at-rest position shown in solid lines and a lower digging position shown in dashed lines. The hydraulic cylinder 5 is pivotable substantially in parallel with the link 4, so as to obtain a parallelogram suspension of the digging tool, which means that with each pivoting movement through the arc shown, between the raised and lowered positions, the tube is always in the same orientation relative to the vertical. The tube 1 can be swung up and down in the vertical plane while maintaining its orientation relative to the vertical by means of the hydraulic cylinder 6, secured between the bracket 2 and the link 4. Instead of the hydraulic cylinder 5, there can be used a link identical with the link 4. The construction according to FIG. 1 is preferred, however, since the tube 1 can be swung back to the position shown in FIG. 2 during the plant transport and planting operation by extending the hydraulic cylinder 5. The mouth of the planting tube 1 thereby is held substantially still in the planting hole, until the plant has been discharged from said tube, despite the forward movement of the vehicle carrying the apparatus.

The planting tube 1 is adapted for the pneumatic or compressed air feeding of plants therethrough. The tube 1 is connected by means of a flexible pipe 7 to a plant supply (not shown) mounted on the vehicle. The tube 1 is provided with upper apertures 8 and lower apertures 9, through which air is vented while the plant descends through the tube. In this way, damage to the plants by the air is avoided.

The feed-in end of the flexible tube 7 may be connected to the feed-in device shown in FIG. 3. This device comprises a substantially vertical plant feed-in pipe 10, and an inlet pipe 11 for pneumatic gas feed. The pipe 11 has the form of an ejector pipe, and is connected to the pipe 10. The pipes 10 and 11 are connected to each other at a distance from the feed end of the feed-in pipe so that a plant inserted therein is subjected to an accelerating movement before it is entrained by the gas which rapidly flows in through the pipe 10. So that the acceleration of the plant is particularly smoothly effected, the pipe can have the form of two slightly flared units 10a and 10b. As shown in the Figure, these may be connected together so as to slightly overlap one another, so that an air gap is formed between said units. Air flows in through the gap, as a result of the ejector action from the air entering via tube 11. The size of the gap can be adjusted. Two supports 10d, 10e are each attached to the base frame, and provided with elongated slots 10f, 10g, through which pass lock bolts 21a, 21b. These bolts can be locked at any point along the elongated slot, and carry with them a supporting bar 10h, which is fixedly attached to the member 10a. Thus, sliding the bolts in the slots with the bar 10h moves the member 10a in or out with respect to member 10b, and thus adjusts the size of the gap 10c therebetween.

In accordance with the invention, the tube 1 at its digging end 1a is provided with a gas conduit 12 (see also FIG. 4) which has an open end 13 a predetermined distance from the tip 16 of the digging tool 1a. The opening 13 is on the leading face 1b of the digging tool. The opening 13 is spaced from the lower end of the tube a distance 13b corresponding to the desired depth of the hole to be dug by the digging tool 1a. The other end of the conduit 12 is connected via line 12a to a control valve (not shown) located on the vehicle carrying the apparatus. By means of the control valve it is possible to connect the conduit 12 alternatively to either a gas-pressure controlled electric signal transmitter, and a means for generating a constant superatmospheric pressure in the conduit, or to a compressed air delivering device, by means of which gas such as air under pressure can be forced through the conduit. The control valve, the signal transmitter and the compressed-air delivering devices are of conventional design, and are not shown in the drawings.

In operation, the vehicle is driven forward, and the digging tool 1a brought into the ground, making a hole (or alternatively, plowing a furrow) that becomes deeper as the vehicle continues forward. While digging the hole, a small superatmospheric pressure is maintained in the conduit 12 via line 12a by means of the device intended therefor, air corresponding to said pressure constantly flowing out through the opening 13. When the digging tool 1a and tip 16 have been driven to the desired planting depth, the orifice 13 has been brought immediately beneath the surface of the ground, and is covered by the uppermost layer of earth at said surface. This blocks the opening 13, and causes an increase in air pressure in the conduit 12 and line 12a.

This increase in pressure is registered by the gas pressure sensing device 20, shown in FIG. 2, that gives an electric signal when gas pressure increases. The gas pressure sensing device senses the increase in gas pressure via lines 12a and 22, and immediately transmits an electric signal. The operator then is alerted, manually to control the feed of the plants from the plant supply, to operate the hydraulic cylinders 5 and 6, and to operate a hydraulic cylinder 14 for operating an earth-compacting device 15 mounted on the tube 1 at 1d, above the digging tool 1a.

The bracket 60 (shown in FIGS. 1 and 2) is pivotably connected to the link 4, and the hydraulic cylinder 5, and fixedly mounted on tube 1. There is a longitudinal or axial slot 61 in the compacting device 15, which permits the device 15 to move over the bracket 60.

Two brackets 62, 63 are fixedly mounted to the compacting means 15, and operatively connected to the piston of the hydraulic cylinder 14, which accordingly can reciprocate the compacting means 15.

Upon completion of the downward movement of the digging tool 1a, the tube 1 is swung from the position shown in FIG. 1 to that shown in FIG. 2, by the hydraulic cylinder 5. At the same time as the tube 1 begins this movement, a plant is fed manually into the tube 10, and air is fed in the inlet pipe 11 to the tube 10 so that the plant is immediately entrained by the air and carried to the tube 1 via the pipe 7. The plant passes through the tube 1, and is discharged at the mouth 1c of the tube 1 into the hole prepared thereby, just as the digging tool reaches the position shown in FIG. 2.

At this moment the hydraulic cylinder 14 for the earth compacting means 15 is activated. This is effected with a delay action, by means of a conventional delay relay (not shown) in response to the signals previously transmitted by the signal transmitter. When the earth compacting means 15 makes contact with the ground, it compacts the earth around the plant placed in said hole with a progressively increasing force.

As a result of the co-action between these two pivoting movements, the tip 16 of the tube 1 does not come into contact with the plant, so as to overturn the plant as the tube 1 is withdrawn from the planting hole. When the tip 16 of the tube 1 has reached a certain distance above the surface of the ground, during the upward movement of the tube, the tube engages the earth compacting means 15 in a manner not shown, and draws it up during the remainder of its movement.

To prevent earth from penetrating the tube 1 via opening 1c when it is inserted into the ground, the lower end of the tube is cut obliquely downwardly, as seen, in the direction of movement of the tube, and the opening faces away from the plowing direction. In accordance with one embodiment of the invention, the lower end of the tube is obliquely cut in a plane which, at each part of the insertion movement of the tube, is inclined more steeply than the direction of movement of said tube. In FIG. 1, the reference 17 indicates the obliquely cut surface on the tube 1, and $\alpha$ the angle of inclination of the surface to the vertical. The reference $\beta$ indicates the angle between the vertical and the tip 16 of the tube 1, during downward movement of the tube into the ground. As will be seen from the Figure, the length of the link 4 is chosen so that the angle $\beta$ is greater than the angle $\alpha$. This means that when the tip 16 of tube 1 is inserted into the ground, there is formed in the ground on the rear side of the tube an air gap 18 of triangular section, as a result of which the earth does not come into contact with the mouth 1c of the tube, to block the same.

As previously mentioned, when the tube 1 is mounted on the vehicle by means of the parallelogram-device shown in FIG. 1, the tube 1 will form a substantially constant angle to the vertical at each part of its downward movement. In this way, the angle $\alpha$ between the vertical and the obliquely cut surface 17 is constant, which prevents earth entering the tube when said tube is lowered in a direction the angle $\beta$ of which to the vertical is greater than the angle $\alpha$.

Although the described apparatus is preferred, it is not necessary for the device to be provided with an obliquely cut tube carried by a parallelogram-device. The tube 1 may also be mounted in a conventional manner, in the free end of an arm pivotally mounted on the vehicle, and provided with a conventional earth compacting wheel. In this case, however, the length of the arm and the angle $\alpha$ formed by the obliquely cut surface of the tube 1 to the vertical should be so selected that said angle is less than the angle $\beta$ formed by the tube 1 to the vertical, at least during the latter portion of the downward movement of said tube.

The obliquely cut tube described above is suitable for use with both plowing-type and hole-making type planting devices.

In order to facilitate the insertion of a planting plow into the ground, the underside of the plow share can, in accordance with a particularly suitable embodiment of the invention, be of an oval, downwardly curved configuration. FIG. 4 illustrates such a planting plow, in the form of a hollow plowing planting tube. The long vertically directed axis of the oval-shaped end may be from 2.5 to 6, preferably from 3 to 4, times longer than the short axis, seen in the direction of movement of the plow.

With this construction of the planting plow, the resistance offered to the plow by solid objects on the ground as the plow is inserted into the ground is reduced. The time thus gained each time the plow is moved into the ground is of great importance, because of the relatively high speed at which the plow must be moved forwards, in order to achieve a satisfactory planting rate, and because of the normally very small areas within which the plow can be inserted into the barren forest ground.

Having regard to the foregoing disclosure, the following is claimed as inventive and patentable embodiments thereof:

1. A planting machine for planting plants, having a pneumatic depth indicator on a digging tool indicating when a predetermined depth is reached by the digging tool, comprising, in combination, means for holding a supply of plants to be planted; a digging tool for digging a hole for a plant; means for conveying a plant from the supply to the holes; a vehicle carrying the digging tool, the conveying means, and the plant supply; and a depth indicator in operative association with the digging tool and which gives a signal when the digging tool has reached a predetermined depth for a plant to be transferred by the conveying means to the hole, the depth indicator comprising at least one gas conduit for conveying a gas under superatmospheric pressure from one end to the other end thereof, the one end being adapted to be connected to a gas supply, and the other end being open to the atmosphere and spaced a vertically projected distance from the tip of the digging tool equal to the depth of the hole dug by the tool for a plant, the other end being so arranged that the opening to atmosphere is plunged into blocking contact with the earth when the predetermined hole depth is reached, thereby halting flow of gas from the conduit, resulting in an increase in gas pressure in the conduit; and means responsive to such increase in gas pressure and giving a signal.

2. A planting machine in accordance with claim 1, in which the depth indicator comprises means connected to the one end of the gas conduit for maintaining a constant superatmospheric gas pressure in the conduit.

3. A planting machine in accordance with claim 1, in which the depth indicator comprises means connected to the one end of the gas conduit for causing gas to flow through the conduit while the digging tool is being moved into the ground.

4. A planting machine in accordance with claim 1, in which the depth indicator comprises a gas-pressure measuring device connected to the one end of the gas conduit for detecting an increase in gas pressure in the conduit caused by earth blocking the outflow of gas from the other end of the conduit when the tube reaches the surface of the ground.

5. A planting machine in accordance with claim 1, in which the gas conduit is a part of the digging tool.

6. A planting machine in accordance with claim 5, in which the conduit is an internal passage built into the digging tool.

7. A planting machine in accordance with claim 1, in which the gas conduit is attached to the digging tool.

8. A planting machine in accordance with claim 1, in which the digging tool is a tube whose digging end is cut off at an angle of less than 45° to the axis of the tube, with a sharp tip having an opening of oval configuration and downwardly curved, as seen in the direction of travel of the tool while digging, with the long axis of the oval-shaped end being vertically directed and being from about 2.5 to about 6 times longer than the short axis.

9. A planting machine in accordance with claim 1, in which the digging tool is arranged to be inserted into the ground along a path directed obliquely downwards and forwards in the direction of movement of the vehicle carrying the device.

10. A planting machine in accordance with claim 9, in which the digging tool is a tube having a central passage through which plants can be fed to a hole dug by the tool, and the tip of the digging tool is placed so that the leading side is solid tube, and an oval opening faces rearwardly.

* * * * *